June 29, 1948.　　　　D. A. SEAVER　　　　2,444,375
LIPSTICK CONTAINER
Filed Sept. 2, 1944
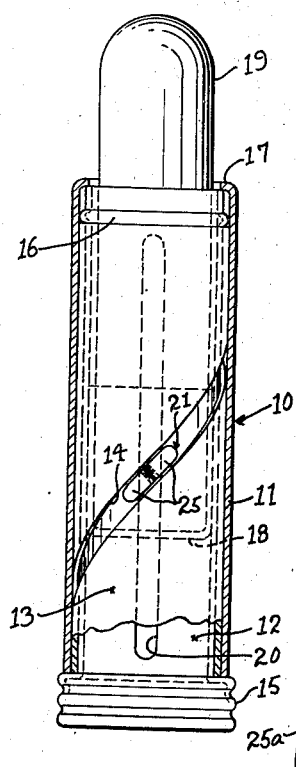
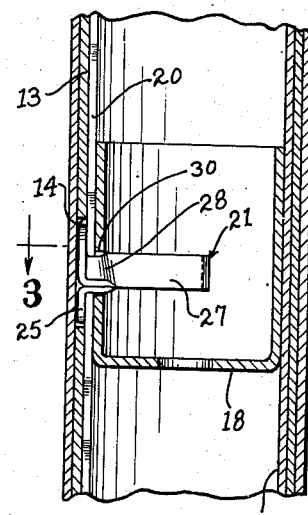
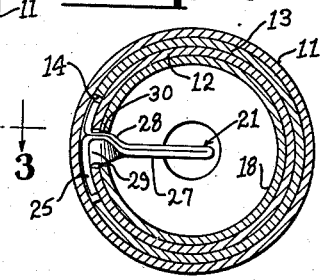
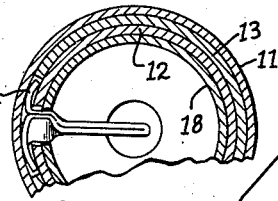
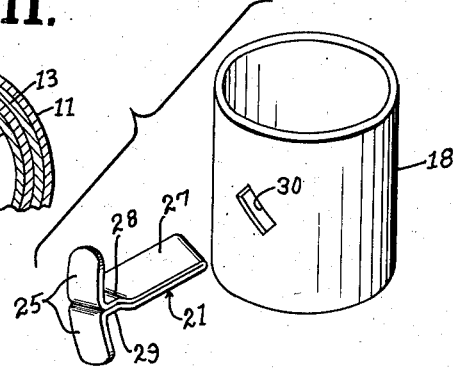
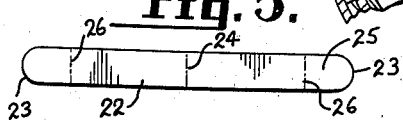
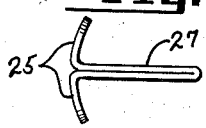
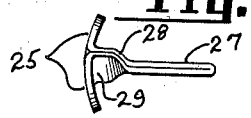
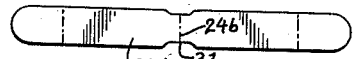
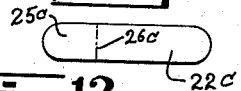
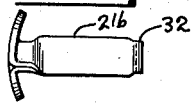
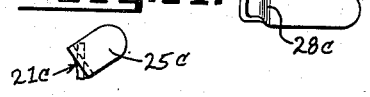
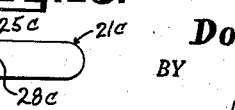
INVENTOR.
Donald A. Seaver,
BY
H. F. Johnston Patented June 29, 1948

2,444,375

UNITED STATES PATENT OFFICE 2,444,375

LIPSTICK CONTAINER

Donald A. Seaver, West Cheshire, Conn., assignor to Scovill Manufacturing Company, Waterbury, Conn., a corporation of Connecticut Application September 2, 1944, Serial No. 552,472

17 Claims. (Cl. 206—56)

This invention relates to certain improvements in dispensing containers for lipstick, eyebrow pencil and similar soft pasty cosmetics. Particularly the invention relates to a type of container in which the cosmetic is supported in a carrier which is elevated and retracted within a casing by rotating one member relative to another member, and which type of container is generally known as a swivel type of lipstick container.

This invention pertains particularly to the construction of the pin member that is employed for elevating the carrier cup within the container coincident with rotating one part of the container relative to another part. Heretofore, the pins for this type of article have been generally made from screw machine products or headed pins which have been more or less expensive to manufacture, requiring a difficult riveting operation in assembling the pin to the carrier cup and presenting only a relatively small surface area of the pin head to the side edges of a helical groove through which the pin head operates for elevating and retracting the carrier cup within the container.

It is one of the objects of this invention to make this elevating pin out of a strip of sheet material preferably, although not necessarily, of metal, in which the breadth of the pin is no wider than the width of the strip of material from which it is cut, thus having little waste of material.

Another object of this invention is to fabricate the elevator pin from sheet strip in such a manner that it can be readily assembled and disassembled from the carrier cup, thus permitting the carrier cup to be removed from the casing and salvaged in case any part of the casing is found defective.

A further object of this invention is to construct the elevator pin from sheet material and form it to provide for a head and a body part with the latter being given a twist adjacent the head that will serve as a partial locking means when assembling the pin through an opening in the carrier cup, and also for another purpose of presenting a relatively narrow edge of the pin to the pasty stick material when assembling the latter axially into the carrier cup.

With these and other objects in view, the invention consists in certain novel features of construction, combinations and arrangement of parts, as will be more fully disclosed in connection with the accompanying drawing and as set forth in the annexed claims.

In the drawing:

Fig. 1 is generally an elevational view of the interior part of a swivel type lipstick container with the outside shell in section and the cover member omitted.

Fig. 2 is an enlarged fragmentary sectional view taken at 90° to the view of Fig. 1 and showing a side elevation of the operating pin.

Fig. 3 is a transverse sectional view taken substantially along the line 3—3 of Fig. 2.

Fig. 4 is a perspective view of the carrier cup and the operating pin in detached relationship.

Fig. 5 is a development plan view of the strip sheet material from which the elevator pin is fabricated.

Fig. 6 is an upper edge view of the elevator pin as it appears in folded state.

Fig. 7 is a similar view except showing the lug ends twisted relative to the folded body part of the pin member.

Fig. 8 is an end view of Fig. 7 as it appears from the right.

Fig. 9 is a modification of the blank as shown in Fig. 5 having a central portion clipped out.

Fig. 10 shows a side view of the pin made from the strip shown in Fig. 9 in its completed form.

Fig. 11 is a view similar to Fig. 3 except showing a modification wherein the lugs of the elevator pin are formed in smaller arcs.

Fig. 12 is a blank from which a further modified form of sheet metal elevator pin may be formed.

Fig. 13 is a front elevational view of the modified form made from the blank shown in Fig. 12, and Fig. 14 is an end view of the same as it appears from the left.

Referring now to the drawing in which like reference numerals refer to corresponding parts throughout the several views; the numeral 10 refers generally to a dispensing container with the cover member omitted. The container comprises an outside tubular shell casing 11 and an inside shell 12 rotatably mounted within said casing 11. Disposed between the outside shell casing 11 and the inside shell 12 and adapted to be retained and carried by the outside shell casing 11 is a spiral sleeve 13 having a helical slot or groove 14 extending from end to end thereof.

The base or lower end of the inside shell 12 is provided with an enlarged integral head 15 having a diameter slightly larger than the diameter of the outside shell casing 11 and preferably provided with formed circumferential ribs to present a better gripping surface to facilitate the operation of the device. Removed from the upper open end of the inside shell 12 is an outwardly knurled bead 16 for holding the spiral sleeve 13 within confined quarters. The upper end of the outside shell casing 11 is spun over as at 17 to cover up the raw edge of the inside shell 12 and present a better finished appearance at the opened end of the container 10.

Mounted to slide within the inside shell 12 is a carrier cup or elevator member 18 in which a cosmetic stick 19 is held. The inside shell 12 is formed with a longitudinal slot 20 extending substantially the entire length thereof.

The purpose of this invention is to provide a much cheaper and simpler pin construction which cooperates with the mechanism generally employed in swivel type lipstick containers for the purpose of elevating and retracting the carrier cup therewithin. To this end the elevator pin, generally indicated by the numeral 21, is preferably formed from a strip of flat sheet material from which a predetermined length is clipped to provide a longitudinal blank 22, such as shown in Fig. 5, having opposite rounded edges 23.

The blank 22 is initially folded at a center fold lise 24, indicated by a dot-and-dash line in Fig. 5, through an angle of 180° and flat upon itself so as to present a double material thickness for the body part 27 proper of the pin 21. Adjacent the opposite ends of the blank 22, lugs 25 are folded outwardly about fold lines 26 (see Fig. 5) substantially at right angles to the body part of the pin 21. The lugs 25 are preferably formed arcuately in conformity to the outside diameter of the inside shell 12 against which wall the lugs are adapted to engage. In this state the upper view of the elevator pin would appear as illustraed in Fig. 6.

In order to present the narrowest edge of the pin 21 in an upward position when assembled into the carrier cup 18 so that little difficulty will be encountered when assembling the stick material 19 into said carrier cup 18 and also to present the end lugs 25 in a position to conform to the angular inclination of the helical groove 14, the double folded body 27 of the pin 21 is given a twist as at 28 (see Fig. 7) adjacent the end lugs 25 but allowing for a more or less flat portion 29 the length of which would be comparable to the combined wall thicknesses of the carrier cup 18 and inside shell 12. The carrier cup 18 is provided with a rectangular opening 30 through its wall of a size suitable to receive the folded portion 27 of the pin 21, and the particular position of the opening 30 is such that it is disposed substantially perpendicular to the axis of the helical groove.

In assembling the container parts together the spiral sleeve 13 is first slipped over the inside shell 12 and confined between the head 15 and the knurled bead 16. The carrier cup 18 will next be dropped into the interior of the inside shell with the rectangular opening 30 thereof alined with the longitudinal slot 20 of the inside shell 12 and also with some portion of the helical slot 14. The elevator pin 21, in its completed form, as shown in Fig. 7, will then be lined up with the three alined openings 14, 20 and 30 and inserted through the opening 30 of the carrier cup 18. In view of the twist 28 given to the pin 21 and the particular angular position of the cup opening 30, when the pin 21 is completely assembled into the carrier cup 18 the flat part 29 will be disposed within the longitudinal slot 20 and the cup opening 30 with the fold 28 of the pin lying just inside the opening 30 adjacent the inner wall of said carrier cup and serves as a sort of semi-locking feature. Furthermore, by reason of the twist 28 of the pin 21 when assembled and with the flat part 29 disposed in the angular cup opening 30, it will dispose only a double thickness edge of the pin body part 27 uppermost in the carrier cup, and the lugs 25 will be disposed in the proper angular position relative to the angle of the helical groove 14. The width of the blank 22 preferably is such that the lugs will be substantially the same width as the width of the helical slot to present as little play as possible and allow for a free sliding fit. While preference has been given to a rectangular opening 30 in a predetermined angular position in the carrier cup 18 to position a double edge thickness of the body part 27 uppermost in said carrier cup for the reason given, it can be seen that a round opening 30 of a size to accommodate the width of the pin body part 27 can be provided in the cup 18 and operate effectively at will, only losing the effect of the semilocking feature of the pin twist 28. When a round opening 30 might be chosen, the vertical position of the pin body part 27 will be assured within the carrier cup 18 by the engagement of the lugs 25 within the helical groove 14 and the fact that they substantially fill the width thereof.

In the form in Figs. 1, 2 and 3 the metal thickness of the blank 22, from which the pin 21 is fabricated, is not quite as thick as the metal from which the spiral sleeve 13 is made. Therefore, the lugs 25 do not completely fill the depth of the helical slot 14 within which it operates such as shown in Fig. 3. In Fig. 11 there is shown a modification wherein the lugs 25a are formed in an arc considerably less than the radius of the inside shell or such that these arcuate formations of the lug will present a tensioning effect between the adjacent walls of the outside casing 11 and inside shell 12, and act to resist the carrier cup from being forced back into the container 10 when applying the cosmetic material.

In folding metal up on itself such as shown in Fig. 6 there is always a natural tendency of the metal to expand beyond the normal width of the blank from which it is formed at the point where the severest fold is made. To overcome this tendency of the metal to expand edgewise, in Fig. 9 I have shown a modification where the central portion of the blank 22b is cut out at opposite sides as at 31 symmetrical in respect to the mid-point fold line 24b. With the blank 22b thus formed and folded up as per Figs. 6 and 7 to provide an elevator pin 21b as per Fig. 10, the leading end 32 of said pin will be somewhat less in width than the normal width of the body part thereof, thus facilitating in guiding the pin 21b into assembled position particularly through the restricted angular slot 30 of the carrier cup 18.

It is also within the purview of this invention to make a pin wherein there is only one thickness of metal constituting the body part of the pin proper. This modification is shown in Figs. 12, 13 and 14 wherein Fig. 12 shows blank 22c from which this pin 21c may be fabricated having a fold line 26c adjacent one end. A single lug 25c is folded up at right angles to the blank 22c along the fold line 26c and arcuately formed similarly to the lugs 25. The blank 22c will be given a twist as at 28c for the same reasons as the purpose of twist 28 in pin 21. In all other respects the pin 21c when it is assembled into the carrier cup 18 will function in like manner to the pins of Figs. 7 and 10.

While the invention embodying the pin construction has been shown and described in several different forms for use in swivel type of lipstick containers, it will be understood that other changes and variations may be made in the specific pin constructions shown and described and applicable to other types of containers without departing from the scope of the invention as defined in the appended claims.

I claim:

1. In a cosmetic holder of the character described, an outer casing, an inner tubular member rotatable in said casing and having a longitudinal slot, means associated with said outer casing providing for a helical slot, a carrier cup for receiving a cosmetic material and provided with a rectangular wall opening inclined to the axis of said cup, the improvement which consists of an operating pin formed up from a strip of flat sheet material of uniform width and comprising a flat body part insertable through said cup opening and an integral lug bent substantially at right angles to the pin body part, the inclination of said cup rectangular opening predetermining the position of said lug whereby the latter will conform to the pitch of the casing helical slot and is adapted to slidably operate therein.

2. In a cosmetic holder of the character described, an outer casing, an inner tubular member rotatable in said casing and having a longitudinal slot, means associated with said outer casing providing for a helical slot, a carrier cup for receiving a cosmetic material and provided with a rectangular wall opening inclined to the axis of said cup, the improvement which consists of an operating pin formed up from a strip of flat sheet material of uniform width and comprising a double fold flat body part insertable through said cup opening and integral lugs oppositely formed from the ends of said double fold body part, the inclination of said cup rectangular opening predetermining the position of said lugs wherein the latter will conform to the pitch of the casing helical slot and are adapted to slidably operate therein.

3. A cosmetic holder as defined by claim 2 wherein the bent lugs are formed in an arc conformable to the outside diameter of said inner tubular member.

4. A cosmetic holder as defined by claim 2 wherein the bent lugs are formed in an arc less than the outside diameter of the inner tubular member to create a frictional factor for the pin lug when operating within said helical slot.

5. In a cosmetic holder of the character described, an outer casing, an inner tubular member rotatable in said casing and having a longitudinal slot, means associated with said outer casing providing for a helical slot, a carrier cup for receiving a cosmetic material and provided with a wall opening, the improvement which consists of an operating pin blanked and formed up from a strip of flat sheet material and providing for a flat body part insertable through said cup opening and a lug bent substantially at right angles to said body part, said body part further being given a twist relative to said lug such that when said lug is disposed in said helical slot said body part will be disposed in a plane substantially parallel to the axis of said holder.

6. In a cosmetic holder of the character described, an outer casing, an inner tubular member rotatable in said casing and having a longitudinal slot, means associated with said outer casing providing for a helical slot, a carrier cup for receiving a cosmetic material and provided with a rectangular shaped wall opening, the improvement which consists of an operating pin formed up from a strip of flat sheet material and comprising a flat body part insertable through the cup opening, a lug bent substantially at right angles to the pin body part, said body part being given a twist relative to said lug and adjacent said lug, and said cup rectangular opening being biased to the cup axis to a degree to dispose the lug in a position conformable to the pitch of the casing helical slot.

7. In a cosmetic holder of the character described, an outer casing, an inner tubular member rotatable in said casing and having a longitudinal slot, means associated with said outer casing providing for a helical slot, a carrier cup for receiving a cosmetic material and provided with a rectangular shaped wall opening, the improvement which consists of an operating pin formed up from a strip of flat sheet material and comprising a flat body part insertable through the cup opening, a lug bent substantially at right angles to the pin body part, said body part being given a twist relative to said lug and adjacent said lug, and said cup rectangular opening being biased to the cup axis to a degree to dispose the lug in a position conformable to the pitch of the casing helical slot, the position of the body part twist disposed directly inside the inner wall of said carrier cup as a means of partially locking the operating pin against axial removal.

8. In a cosmetic holder of the character described, an outer casing, an inner tubular member rotatable in said casing and having a longitudinal slot, means associated with said outer casing providing for a helical slot, a carrier cup for receiving a cosmetic material and provided with a rectangular shaped wall opening, the improvement which consists of an operating pin formed up from a strip of sheet metal and comprising a flat body part insertable through the cup opening and a lug bent substantially at right angles to the pin body part, said cup rectangular opening being biased to the cup axis and said body part having a twisted portion adjacent said lug but removed a slight distance therefrom such that said twisted portion will be disposed directly inside the inner wall of the carrier cup, the angular position of the rectangular cup opening serving to dispose the pin lug in a position to be slidably received in said helical slot.

9. In a cosmetic holder of the character described, comprising an outer casing having a helical groove, an inner tubular member rotatable in said casing and having a longitudinal slot, a carrier cup for receiving a cosmetic material having a rectangular opening in its side wall inclined to the axis of said cup, the improvement which consists of an operating pin in the form of a blank of flat sheet material of uniform width, said blank being folded upon itself to provide a body part of double material thickness with the folded end insertable through the cup opening and the ends of said blank being oppositely bent to provide a pair of opposed lugs for slidable engagement in said helical groove, the body part of said pin having a twisted portion adjacent said lugs which twisted portion is engaged in said cup opening to predetermine the position of said pin whereby the body part of said pin will be disposed in a plane substantially parallel to said cup axis and the lugs will be disposed in a position to be received in said helical groove.

10. A cosmetic holder as defined by claim 9 wherein the opposed lugs are formed in an arc conformable to the outside diameter of said inner tubular member.

11. A cosmetic holder as defined by claim 9 wherein the opposed lugs are formed in an arc less than the outside diameter of the inner tubular member to create a frictional factor for the pin lugs when operating within said helical groove.

12. In a cosmetic holder of the character described, comprising an outer casing having a helical groove, an inner tubular member rotatable in said casing and having a longitudinal slot, a carrier cup for receiving a cosmetic material and longitudinally slidable within said member, the improvement which consists of an operating pin in the form of a blank of flat sheet material of uniform width, said blank being folded upon itself to provide a body part of double material thickness with the ends bent oppositely to provide for a pair of opposed lugs slidably engaged in said helical groove, the body part of said pin having a twisted portion adjacent to said lugs, said cup having a rectangular opening for receiving the twisted portion of said body part and inclined to the axis of said cup of a degree to dispose the longitudinal axis of said rectangular opening substantially at right angles to the pitch of said helical groove, whereby the lugs will be positioned to operate in said groove and one double edge thickness of said body part will be disposed uppermost in said carrier cup to present the minimum pin thickness to the cosmetic material coincident with the assembly.

13. A cosmetic holder as defined by claim 12 wherein the leading end of the folded body part of said pin is of reduced width to facilitate its entrance into said cup opening.

14. As an article of manufacture, an operating pin for use with a carrier cup of a swivel type lipstick container, said pin being made from a straight strip of flat material of uniform width throughout its length and comprising a straight flat body portion, a lug portion and an intermediate connecting neck portion, said neck portion having substantially a quarter twist relative to and at its point of connection with said body portion, and said lug portion bent substantially at right angles to and at the opposite end of said neck portion and positioned on a biased angle relative to the plane of said body portion.

15. An article of manufacture as defined by claim 14 wherein the lug portion is of slightly arcuate shape relative to its axial length and inwardly toward the body portion.

16. As an article of manufacture, an operating pin for use with a carrier cup of a swivel type lipstick container, said pin being made from a straight strip of flat material of uniform width throughout its length and folded flat upon itself at a mid portion to provide for a straight flat body portion of double material thickness, and intermediate connecting neck portion of double material thickness having substantially a quarter twist relative to and at its point of connection with said body portion, and a pair of opposed lugs bent substantially at right angles to and at the opposite end of said neck portion and positioned on a biased angle relative to the plane of said body portion.

17. An article of manufacture as defined by claim 16 wherein the opposed lugs are of slightly arcuate shape relative to their axial length and inwardly toward the body portion.

DONALD A. SEAVER.

REFERENCES CITED

The following references are of record in the file of this patent:

UNITED STATES PATENTS

| Number | Name | Date |
| --- | --- | --- |
| 799,618 | St. John | Sept. 12, 1905 |
| 954,250 | Brooks | Apr. 5, 1910 |
| 1,614,831 | Crofoot | Jan. 18, 1927 |
| 1,835,580 | Wild | Dec. 8, 1931 |
| 1,849,914 | Delvin | Mar. 15, 1932 |
| 2,055,427 | Churchill | Sept. 22, 1936 |
| 2,113,861 | Segal | Apr. 12, 1938 |
| 2,260,690 | Place | Oct. 28, 1941 |
| 2,332,147 | Holihan | Oct. 19, 1943 |
| 2,352,448 | Reichenbach | June 27, 1944 |

FOREIGN PATENTS

| Number | Country | Date |
| --- | --- | --- |
| 9,501 | Great Britain | 1914 |